March 23, 1937.  R. H. BEARDSLEY  2,074,976
WOODWORKING MACHINE
Filed Feb. 29, 1936  3 Sheets-Sheet 1
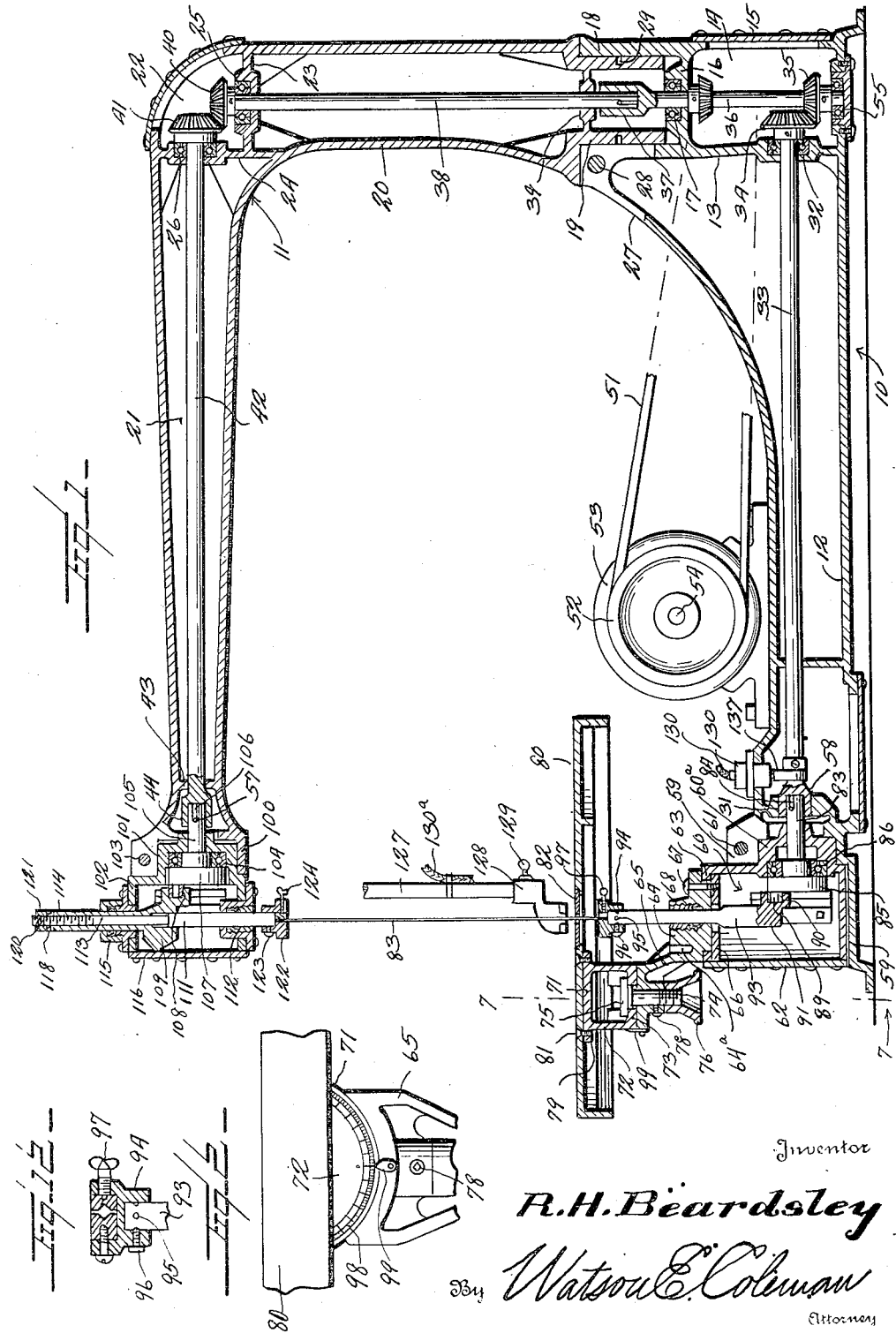
Inventor
R. H. Beardsley
By Watson E. Coleman
Attorney March 23, 1937. R. H. BEARDSLEY 2,074,976
WOODWORKING MACHINE
Filed Feb. 29, 1936   3 Sheets-Sheet 2
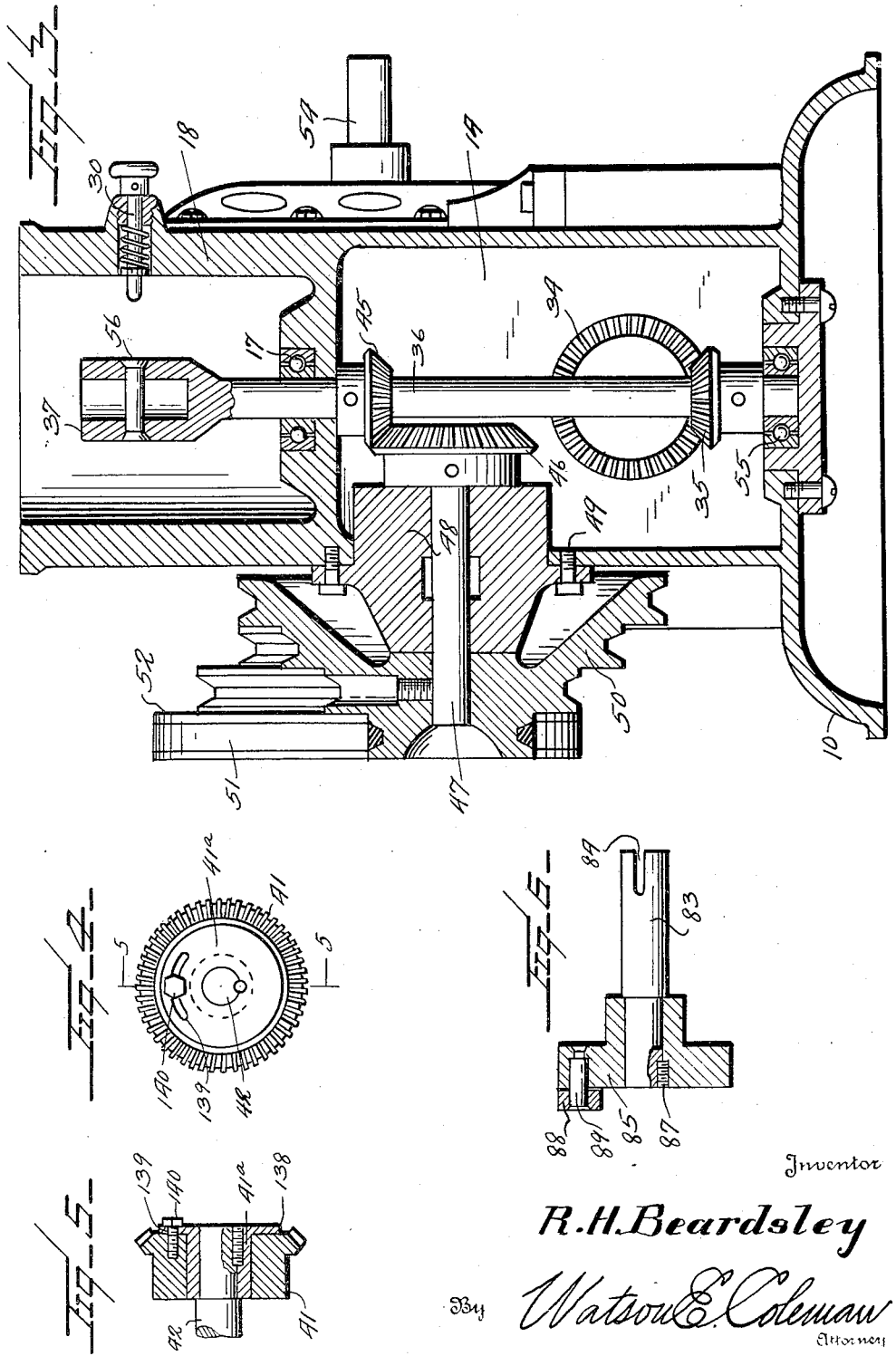

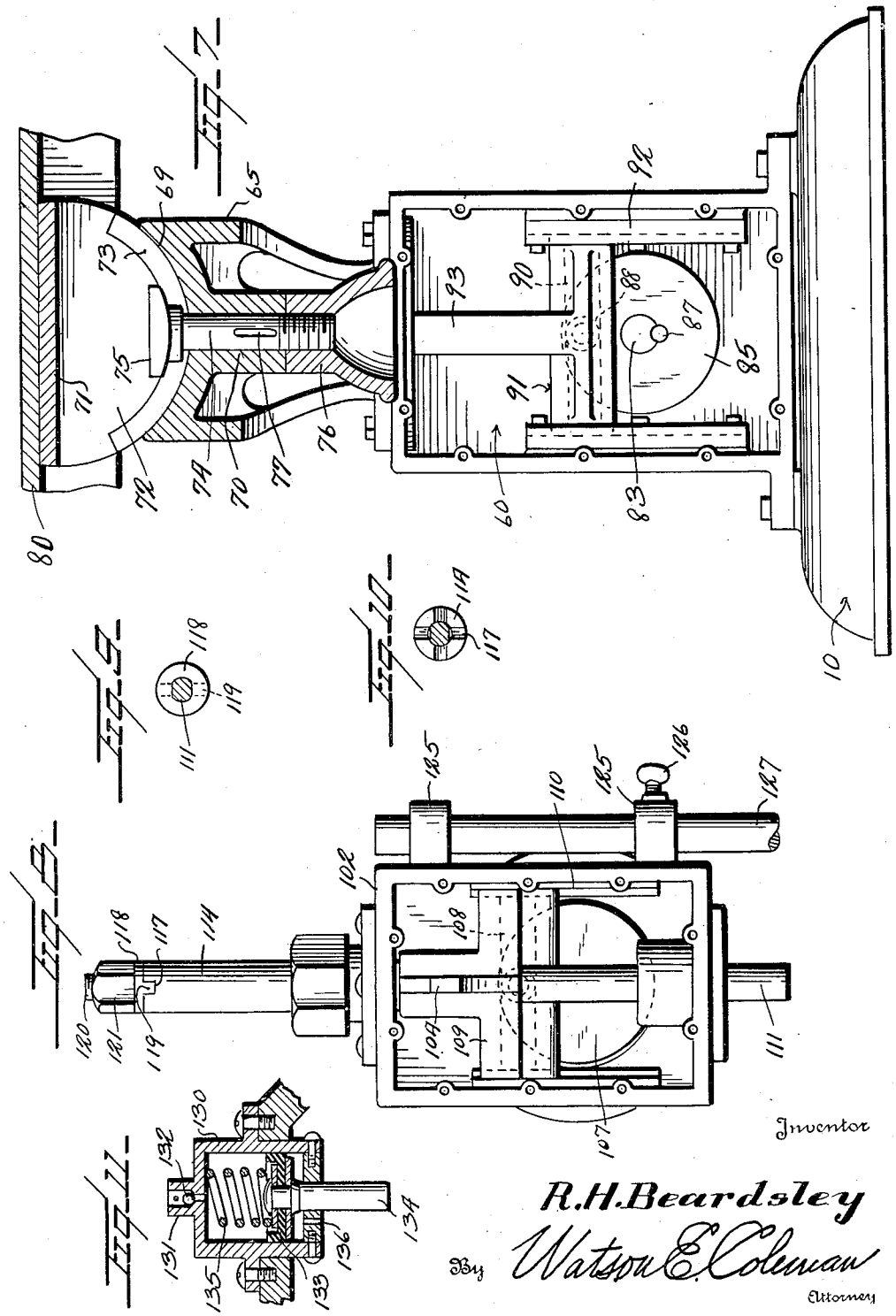

Patented Mar. 23, 1937

2,074,976

UNITED STATES PATENT OFFICE 2,074,976

WOODWORKING MACHINE

Ralph H. Beardsley, Marion, Ohio

Application February 29, 1936, Serial No. 66,495

9 Claims. (Cl. 143—70)

This invention relates to sawing machines and particularly to motor driven "jig" saws.

One of the objects of the present invention is to so construct the saw blade reciprocating means as to do away with the use of return springs and like devices, and provide means which will eliminate to a large extent the breakage or buckling of saw blades due to unequal movement or tension of the saw blade at its upper or lower ends.

Another object is to provide a structure of this kind which includes two cranks or cams disposed to operatively engage through said clamping device with the saw blade at its upper and lower ends, these cranks or cams causing a positive reciprocation of the saw blade.

A further object is to provide a work supporting table which may be rotated through an entire circle with reference to the saw blade and which may be canted or tilted at any desired angle and in any position of the table.

A further object is to provide a sectional saw supporting frame, the sections of which are detachable from each other, these sections supporting driving shaft sections which in turn are disconnectible from each other so as to thus permit various attachments to be driven from these driving shafts and in this connection provide means whereby the shafts shall be engaged with each other only when disposed in a particular coactive relation.

A still further object is to provide a saw frame and saw operating mechanism which is so constructed that any length of material can be sawed without removing the upper arm of the frame, and another object is to provide means whereby a proper tension can be secured upon the saw blade and whereby the saw blade may be rotatably adjusted so that the teeth will be disposed either toward the rear of the supporting frame, toward the front thereof, or towards either side, or at any desired point between these positions.

Other objects will appear in the course of the following description.

My invention is illustrated in the accompanying drawings wherein:—

Figure 1 is a vertical section through the saw supporting frame and the table, the motor being shown in elevation;

Figure 2 is a fragmentary front elevation of a portion of the table with a portion of the means whereby the table may be tilted;

Figure 3 is an enlarged vertical section through the base of the supporting frame, the section being taken at right angles to the section in Figure 1, and showing the driving means;

Figure 4 is a front elevation of the beveled gear wheel used at the upper corner of the frame for transmitting motion to the uppermost cam or crank;

Figure 5 is a section on the line 5—5 of Figure 4;

Figure 6 is a section through the disk crank or eccentric with its stub shaft;

Figure 7 is a section on the line 7—7 of Figure 1, showing a face view of the casing or head with the front plate removed enclosing the lower cam or eccentric and showing the yoke reciprocated thereby, the upper portion of the figure showing in transverse section the means whereby the table is tilted;

Figure 8 is an elevation of the casing for the upper cam or eccentric, the front plate being removed;

Figure 9 is a top view of the washer which coacts with the tension adjusting nut of the upper head;

Figure 10 is a top plan view of the sleeve carried by the yoke;

Figure 11 is a vertical sectional view through the blower;

Figure 12 is a fragmentary vertical section through the preferred form of saw or file holding clamp.

Referring to these drawings and particularly to Figures 1 and 2, it will be seen that the frame of the saw is formed in two sections. The base section is designated generally 10 while the upper section is designated generally 11. The base section has a hollow horizontal portion 12, the rear end of which is formed with the vertical transverse wall 13 forming the front wall of a chamber 14, the rear wall of this chamber having therein the removable plate 15. The chamber 14 constitutes a gear chamber. Above this chamber 14 there is a transversely extending septum 16 carrying ball bearings 17. Above this septum or partition 16, the base is formed with a vertically disposed socket 18 open at its upper end for the reception of the lower reduced end 19 of the vertical portion 20 of the upper frame 11. The portion 20 extends upward to any desired height and at its junction with the horizontal upper arm 21 there is formed a gear chamber 22 defined by the horizontal septum 23 and the vertical septum 24 carrying bearings 25 and 26. I have illustrated the front wall of the socket 18 as being split at 27 and as being capable of being clamped upon the reduced end 19 of the upper section 11 by means of the bolt or screw 28. The reduced portion or spigot 19 is formed in its circumference with a plurality of recesses 29 and, as shown in Figure 3, the socket 18 carries a spring projected pin 30 which may be projected into any one of these recesses or notches 29 so as to hold the upper section 11 in any desired angular relation to the lower section. Of course, where sewing is being done, the section 11 will be held with its arm 21 in vertical alinement with the portion 12.

The forward end of the portion 12 carries a bearing at 31 and mounted in this bearing 31 and in the bearing 32 carried by the wall 13 is a lower longitudinally extending shaft 33. This shaft at its rear end carries a beveled gear wheel 34 which in turn engages a beveled gear wheel 35 mounted upon a vertical shaft section 36, which extends through the bearing 17, and is provided at its upper end with an upwardly opening socket or joint member 37 for engagement with a shaft 38 extending upward through the portion 20 and mounted at its lower end in a bearing 39 and at its upper end in a ball bearing 25. This shaft carries a beveled gear wheel 40, which engages a beveled gear wheel 41 mounted upon a horizontal shaft 42 carried within the arm 21 and supported at its rear end by the ball bearings 26 and at its forward end by a bearing 43. This shaft 42 at its forward end is formed to provide a socket 44. The shaft section 36 is driven, as shown in Figure 3, by providing this shaft section with a beveled gear wheel 45 which in turn engages a beveled gear wheel 46 carried by a transversely extending shaft 47 mounted in a detachable bearing 48 extending through an opening in the side wall of the chamber 14 and held in place by screws 49. The outer end of this shaft carries upon it a comb pulley 50 over which is trained a band or belt 51 leading from the pulley 52 of a motor 53, which may conveniently be an electric motor, though obviously I do not wish to be limited to this. The band 51 may be shifted to any one of the grooves of the comb pulley so as to secure any desired operating speed. In Figures 1 and 3, the motor shaft is designated 54. The lower end of the shaft 36 is supported in a thrust bearing 55 which is shown as detachably mounted in the lower end wall of the chamber 14. It will be noted that the socket 37 is provided with a transverse pin 56 and that the lower end of the shaft 38 is provided with a corresponding slot extending inward from the shaft and which engages over this pin. This pin 56 does not intersect the axial center of the socket 37, but is disposed to one side of this axial center so that the shaft 38 can be inserted into the socket only in one position. The socket 44 is also provided with such a transversely extending pin 57 which is also disposed to one side of the axial center. The same construction is provided for the socket 58 carried upon the forward end of the shaft 33.

The forward end of the lower section 10 of the frame is formed with a split socket 59 within which is disposed the spigot 60ª of a casing designated generally 60. The socket 59 is clamped upon this spigot by means of the bolt or screw 61. The front of the casing 60 is provided with a detachable face plate 62. The side walls of the casing are formed with an inwardly extending flange 63 and supported upon this flange is the base 64 of a bracket 65. Disposed below the flange 63 is a plate 66 and screws 67 extend down through the base 64 and into this plate, thus clamping the base 64, which constitutes the upper wall of the chamber 60, in place. The members 64 and 66 are provided with coincident apertures for the passage of the connecting rod which engages with a saw blade, as will be later described. This connecting rod operates through a stuffing box 68. The base 64 of the bracket 65 is rotatably adjustable around the vertical axis of the chamber 60 through an entire circle, this base 64 being in effect swivelled upon the upper end of the casing 60.

The bracket 65, as shown most clearly in Figure 7, at its upper end is formed with a transversely concave recess 69 and with a centrally disposed bore 70. Resting upon the upper end of the bracket is a table supporting element 71 having downwardly extending side walls 72, the lower edges of which are transversely curved complementary to the transverse concavity 69, these lower edges being provided with the inwardly projecting flanges 73. Extending through the bore 70 is a bolt 74 having a head 75 at its upper end which extends over these flanges 73 and is convex on its under face to fit the curvature of these flanges. The lower end of this bolt is screw threaded and provided with a nut 76. This bolt is slotted at 77 and a set screw 78 passes through the wall of the bracket, as shown in Figure 1, and into this slot so that the bolt 75, while it may move up and down, cannot rotate. By turning up upon the nut 76, the supporting element 71 may be held in any angularly adjusted position within the range of its movement upon the concave seat 69.

The upper end of the member 71 is flanged at 79 and the table 80 is held in place upon the supporting element 71 by means of the screws 81 which pass through the table and into these flanges 79. Thus it will be seen that the table may be rotated around the axial center of the chamber 60 and that the table may be tilted to an angle of 45° to a vertical plane in either direction and in any rotated position of the bracket. The table is made of metal and is reinforced by downwardly extending ribs, as shown in Figure 1. The central portion of the table is provided with a plate 82 having an aperture through which the saw blade passes. This saw blade is designated 83.

For the purpose of reciprocating the saw blade, I provide a shaft section 83 which is longitudinally slotted at 84 to engage within the socket 58 and engage with the transverse pin in said socket, as previously described. The outer end of this shaft section 83 carries upon it the disk crank or eccentric 85 and is supported by the ball bearings 86 formed in the rear wall of chamber 60. The disk 85, as shown in Figure 6, is held upon the shaft section 83 by a screw key 87 and carries upon it the roller 88 mounted upon the pin 89. The roller mounted upon the wrist pin 89 engages a slot 90 formed upon the rear face of a yoke 91. This yoke is mounted for vertical movement in the vertical guides 92 shown in Figure 7, so that as the disk 85 rotates, the yoke will be reciprocated. This yoke carries upon it the upwardly extending rigid connecting rod 93 which passes up through the stuffing box 68 and has mounted upon its upper end the adjustable saw clamp 94. This connecting rod is cylindrical in cross section and at its upper end is provided with a plurality of perforations 95. The saw clamp 94 has a socket for the reception of the upper end of the connecting rod 93, this socket being provided with a screw 96 which engages in any one of the perforations 95 so as to hold the saw clamp 94 in any one of a plurality of rotatably adjusted positions upon the upper end of the connecting rod. The saw clamp has a set screw 97 whereby a clamping action can be exerted upon opposed blocks which clamp the saw 85 and by reversal may clamp upon a file.

It will be noted from Figure 2 that the outer wall 72 of the supporting element 71 is provided with graduations 98 and that the bracket is provided with an index pointer 99 coacting with these graduations whereby the table 80 may be set to any desired angle within its range of movement to a vertical plane passing upward through the bracket 65.

The upper arm 21 at its forward end is formed with a socket 100, which is likewise split and disposed within this socket is the reduced rear portion 101 of a gear casing or hollow head 102 corresponding in function with a gear casing or hollow head 60 previously described. The reduced or spigot portion 101 may be clamped in position within the socket 100 by means of the clamp screw 103. Disposed in bearings 104 carried by the spigot portion is a shaft section 105 whose rear end is longitudinally slotted at 106 and is receivable within the socket 44 and engages the pin 57. The forward end of this shaft section 105 is provided with the crank disk or eccentric 107 having a wrist pin and a roller of the same character as illustrated in Figure 6 for the crank disk 85. This engages in a slot 108 formed in the rear face of the yoke 109, as shown in Figure 8, this yoke being vertically reciprocable within the casing 102 and being guided by the guides 110. This yoke carries upon it the downwardly extending connecting rod 111 which extends through a stuffing box 112 carried by the lower wall of the chamber 102. The upper end of this connecting rod is reduced in diameter, as at 113, and extends upward through a sleeve 114 carried by the yoke 109 and which sleeve operates through a stuffing box 115 mounted upon the upper end of the chamber 102. The forward end of the yoke 109 may bear against the detachable front wall 116 of the gear casing or chamber 102, as shown in Figure 1. The upper end of the sleeve 114 has two opposed pairs of notches 117, as shown in Figure 10, which extend at right angles to each other, and coacting with this upper end of the sleeve is a washer 118 shown in Figure 9, provided with a pair of downwardly extending lugs 119, which engage in these notches 117. Thus the washer may be held in any one of four rotated positions.

It will be seen from Figure 9 that the connecting rod 111 is flattened on opposite sides and that the washer 118 has a central aperture conforming exactly to the transverse section of the connecting rod. The opposite rounded portions of the connecting rod are screw threaded at 120 and engaging these screw threads is a nut 121 so that as this nut is turned in one direction, the connecting rod will be pulled upward to tension or tighten the saw blade 83 to any desired amount. By loosening the nut 121 and rotating the washer, the connecting rod will be rotated and the saw blade will be axially rotated with the connecting rod.

It will be seen from Figure 1 that the lower end of the saw blade is likewise engaged by a saw engaging clamp 94 which is rotatable around the longitudinal axis of the connecting rod 93. Thus the saw may be axially rotated so as to present its toothed face either towards the rear, front or either side of the machine. The lower end of the connecting rod 111 carries upon it the saw clamping element 122 and held in place upon the connecting rod by the screw 123 or equivalent means, the saw being clamped by means of the set screw 124 or equivalent means.

As shown in Figure 8, one side wall of the casing 102 is provided with eyes 125, the lowermost eye having a set screw 126, and adjustably mounted within these eyes is the shank 127 of a presser foot 128 held in place by means of a set screw 129.

For the purpose of blowing dust away from the work, I have provided a blower shown in Figure 11 and comprising a casing 130 which is mounted upon the upper wall of the section 10 at the forward end of this section. The casing has an outward nipple 131 having therein the valve 132. Disposed within the casing is a piston 133 of any suitable construction mounted upon an operating rod or piston rod 134. The piston is urged downward by a spring 135 and the lower wall of the casing is provided with a vent 136. The piston is operated by means of a cam 137 mounted upon the shaft 33. The nipple 131 is so formed that it may be readily engaged with a flexible tube 130ᵃ which may be carried around into position above the table and direct a blast against the upper face of the work to thereby blow away the sawdust which may gather at this point and render invisible the design marks on the work.

One of the advantageous features of this machine is that the sockets 59 and 100 will permit other devices to be connected to the lower and upper arms of the frame and that the socket 18 will permit the ready swinging around of the upper arm from a position over the table, if necessary, or permit the complete detachment of the upper arm so that other devices and attachments may be driven from the shaft 36. Thus attachments may be applied to a frame which will permit the frame to be used with a drill press, a sander, or a router head. The frame and the driving mechanism thereof may also be used for operating a rip saw, a shaper machine, a grinding machine, a mortising machine or a planer. Jeweler's blades may also be used for fine sawing or for metal sawing. By reason of the fact that the saw blade with its clamps may be turned at any desired angle, any length of material can be sawed without removing the top arm and without interference by the upright portion at the rear of the frame. The table is so mounted that it may be turned in a complete circle and will tilt to an angle of 45° to the horizontal in all four directions. By reason of the fact that the saw blade is suspended between and is operated by two rectilinearly movable plungers or yokes operated by cams or cranks in the upper and lower head, respectively, there is no breaking strain placed upon the saw which would tend to break or buckle it. This is for the reason that the upper and lower cams or crank disks are operated in exact unison with each other so that the saw is forced down or up by one crank at exactly the same speed that it is being pulled upward or downward by the other crank. I have, as a test, connected a No. 9 thread to the upper and lower connecting rods and reciprocated this thread without breaking the thread. By my contruction, there is no jerk on the saw blade which causes the saw blade to break or buckle. As shown in Figures 4 and 5, the gear wheel 41 is made adjustable so that it may be adjusted at any time to secure the proper complementary movement of the two shafts 33 and 42. To this end, the gear wheel 41 is made in two sections 41 and 41ᵃ. The section 41ᵃ is keyed upon the shaft 42, as shown in Figure 5, and is provided with an end flange 138 which extends over the section 41. This flange is provided with the concentric slot 139 through which passes a headed screw 140. When this screw is loosened, the gear section 41 may be rotated in one direction or the other to a limited extent upon the inner section 41ᵃ and then the sections may be held in the adjusted position by tightening up upon the screw 140.

The stroke of this saw in actual practice is about 1½" and with this structure, material 6" or more in thickness may be readily cut.

Attention is particularly called to the following advantages of my structure.

The lower frame section 10 terminates at its forward end in a socket 59 whose axis is horizontally disposed; the rear of the frame 10 also terminates in a vertical socket 18; the frame section 11 is entirely removable from this socket 18, and the frame section 11 at its forward end terminates in a horiontally disposed socket 100. The head 102 is removable from the socket 100 and the head 60 is removable from socket 59. There are a large number of attachments which are standard equipment and on the market which, because of the removability of these heads and the removability of the lower end of the frame 11 from the socket 18, can be used in connection with this basic frame and its motor operated shaft. Thus a drill press attachment having a spigot may be inserted within the socket 100 and clamped therein. This drill press, which as before remarked, is standard equipment having a slotted shaft, the inner end of which engages with the socket 44 on shaft 42. A special and standard equipment commonly found on the market may be disposed in the socket 59, this attachment having a spigot to fit this socket and being provided with a shaft fitting within the socket 58 and rotatable with shaft 33. On this special attachment a jointer-planer may be mounted or a sander may be mounted, the sander taking the place of the jointer-planer. A rip-saw may be disposed in place of the jointer-planer or the sander, or a grinding machine may be used, all these machines being driven from the shaft 33. By removing the upper arm 11 from its connection with the socket 18, a shaper having a spigot insertible into this socket 18 may be mounted upon the rear portion of the base section 12 or a flexible shaft carrying a rotatable tool may be connected to the shaft 33, shaft 36 or to the shaft 42, by removing the heads on the ends of the sections 11 and 12. This flexible shaft may be also used for driving accessories.

In Figure 1, a bore 64ᵃ is shown extending downward through the member 64, and this may be used for inserting a standard saw guide which is disposed beneath the table 88 and which is used in sabre sawing. Different saw blades may be used when my machine is used as a sawing machine, and thus the saw blade 83 may be a 14" saw blade, a standard 5" saw blade, or blades for use in jeweler's work or for puzzle making.

It will, therefore, be seen that my invention primarily consists in the provision of a frame so constructed that it may be adapted to a large number of different uses, and it will be obvious that many of the details illustrated might be changed or re-arranged without departing from the spirit of the invention as defined in the appended claims.

What is claimed is:—

1. A structure of the character described, including a frame comprising a hollow base section and a superposed section having a hollow rear vertical portion and a hollow horizontal arm, the base at its rear end having a socket into which the lower end of the vertical portion of the upper section is set, means for clamping the vertical portion in said socket, a vertical shaft in the rear of the base section, a horizontal shaft in the base section, means for driving the vertical shaft, a vertical shaft in the vertical portion of the second named section, a longitudinal shaft in the arm operatively driven from the vertical shaft of the upper section, and a detachable connection between the vertical shaft in the vertical section and the vertical shaft in the base.

2. A structure of the character described, including a frame comprising a hollow base section and a superposed section having a hollow rear vertical portion and a hollow horizontal arm, the base at its rear end having a socket into which the lower end of the vertical portion of the upper section is set, means for clamping the vertical portion in said socket, a vertical shaft in the rear of the base section, a horizontal shaft in the base section, means for driving the vertical shaft, a vertical shaft in the vertical portion of the second named section, a longitudinal shaft in the arm operatively driven from the vertical shaft of the upper section, and a detachable connection between the vertical shaft in the vertical section and the vertical shaft in the base, the arm and the base at their outer ends having sockets, the longitudinal shafts in said base and arm extending into said sockets and being formed at their ends for detachable connection with additional shafts extending into the sockets.

3. A structure of the character described, including a frame comprising a hollow base section and a superposed section having a hollow rear vertical portion and a hollow horizontal arm, the base at its rear end having a socket into which the lower end of the vertical portion of the upper section is set, means for clamping the vertical portion in said socket, a vertical shaft in the rear of the base section, a horizontal shaft in the base section, means for driving the vertical shaft, a vertical shaft in the vertical portion of the second named section, a longitudinal shaft in the arm operatively driven from the vertical shaft of the upper section, a detachable connection between the vertical shaft in the vertical section and the vertical shaft in the base, the arm and the base at their outer ends having sockets, the longitudinal shafts in said base and arm extending into said sockets, hollow heads having spigot portions insertible into said sockets of the arm and base, shafts carried by said hollow heads and detachably engaged with the extremities of the horizontal shafts in the arm and base, cranks mounted upon said shafts of the heads and having wrist pins disposed at the same angle, and connecting rods extending through said heads and towards each other and having transversely slotted yokes at their outer ends with which the wrist pins engage, said connecting rods having means at their inner ends for clamping a saw between the connecting rods.

4. A structure of the character described, including a frame comprising a hollow base section and a superposed section having a hollow rear vertical portion and a hollow horizontal arm, the base at its rear end having a socket into which the lower end of the vertical portion of the upper section is set, means for clamping the vertical portion in said socket, a vertical shaft in the rear of the base section, a horizontal shaft in the base section, means for driving the vertical shaft, a vertical shaft in the vertical portion of the second named section, a longitudinal shaft in the arm operatively driven from the vertical shaft of the upper section, a detachable connection between the vertical shaft in the vertical section and the vertical shaft in the base, the arm and the base at their outer ends having sockets, the longitudinal shafts in said base and arm extending into said sockets, hollow heads having spigot portions insertible into said sockets of the arm and base, shafts carried by said hollow heads and detachably engaged with the extremities of the horizontal shafts in the arm and base, cranks mounted upon said shafts of the heads and having wrist pins disposed at the same angle, and connecting rods extending through said heads and towards each other and having transversely slotted yokes at their outer ends with which the wrist pins engage, said connecting rods having means at their inner ends for clamping a saw between the connecting rods, and a table having an aperture through which a saw may pass.

5. A wood-working machine of the character described, including a frame comprising a hollow longitudinally extending base section and a superposed section having a hollow vertical portion and a hollow horizontally extending arm, the base section at its rear end being formed with a cylindrical split socket opening upward, the vertical portion of the upper section at its lower end having a spigot extending into said socket, means for clamping the socket upon said spigot, the outer end of the arm and the outer end of the base section being formed each with a socket, a vertical shaft disposed in the rear end of the base section and extending upward into the socket above, means whereby said shaft may be driven, said shaft at its upper end having a socket and transversely extending pin, a shaft disposed in the vertical portion of the upper section and having a slot and adapted to be received in the socket of the first named shaft, the slot being engageable with said pin, a horizontal shaft in the arm operatively engaged at its rear end with the vertical shaft of the upper section and at its forward end having a socket and pin, a horizontal shaft in the base section operatively engaged with the vertical shaft in the base section and having in its forward end a socket and pin, a hollow head for the base section having a spigot portion fitting the socket of the base section, means for clamping this spigot portion in place within the socket, a hollow head for the arm having a spigot portion fitting within the socket of the arm, each of said heads having therein a crank disk and a stub shaft alining with the shafts in the arm and base, respectively, each of said stub shafts fitting within the socket of the corresponding horizontal shaft and having a slot to receive said pin, transversely slotted yokes guided for vertical motion within the respective heads and into the slots of which the crank pins extend, each yoke having a connecting rod extending out through one end of the head, the connecting rods facing each other, each of said connecting rods having means for clamping the extremity of a saw blade, and means upon the upper head for tensioning said saw blade.

6. In a structure of the character described, a hollow base section formed with an upwardly extending socket, a shaft extending upward into the socket, means for driving said shaft, the shaft at its upper end being formed with a socket, a hollow vertical section having a spigot at its lower end adapted to fit within the socket, the upper section having a vertical shaft adapted to be received within and have rotative engagement with the vertical shaft of the base section, and means for holding the upper section in any angularly rotative position with relation to the socket of the base section including a spring projected pin carried by the socket of the base section, the spigot of the upper section having a plurality of radially disposed apertures into any one of which said pin may engage.

7. In a machine of the character described, including a hollow horizontally disposed base frame section formed at its forward end with a split socket and with bearings, a shaft disposed in said bearings and extending longitudinally through the frame section and having a socket at its forward end, the rear end of the first named frame section being formed with a vertically extending socket and a vertically extending shaft, a second frame section having a vertical portion formed with a spigot for insertion within the socket at the rear of the first named section and carrying a vertical shaft detachably engageable with the vertical shaft at the rear of the first named frame member and constructed and arranged to have rotative engagement therewith, the forward end of the horizontal portion of the second named frame section having a socket, a horizontal shaft extending through the horizontal portion and driven from the vertical shaft in the vertical portion of the second named section, the horizontal shaft being provided with a socket, means for clamping said sockets upon an object inserted therein, and motor operated means for driving one of said shafts and driving the shafts from each other.

8. In a saw machine, means for engaging and reciprocating one end of a saw blade, including a hollow fixedly supported head, a connecting rod extending through the head and having flat unthreaded side faces at its upper end, the rod being threaded on its edges between said side faces, a reciprocating element mounted within the head and having a tubular portion through which the upper end of the connecting rod extends, the tubular portion having a plurality of notches at its upper end, a washer having lugs engaging said notches and having an aperture provided with flat side faces engaging against the flat side faces of the connecting rod, and a nut engaging the upper end of the connecting rod and bearing against the washer on the upper end of the reciprocating element.

9. In a wood-working machine of the character described, a substantially tubular base section, a substantally tubular upper section having a vertical portion rotatably engaging the rear end of the base section, means for holding said vertical portion in a plurality of rotated positions upon the rear end of the base section, a longitudinally extending shaft in the base section, a longitudinally extending shaft in the upper section, a vertical shaft having driving engagement with the last named horizontal shaft and extending downward through the vertical portion of the upper section, a driving connection between the lower end of said vertical shaft and the rear end of the horizontal shaft in the base section, and means for driving the shaft in the base section.

RALPH H. BEARDSLEY.